(12) United States Patent
Beck et al.

(10) Patent No.: US 8,381,400 B2
(45) Date of Patent: Feb. 26, 2013

(54) METHOD OF MANUFACTURING A CHECK VALVE

(75) Inventors: Hubert Beck, Eitorf (DE); Klaus Schmitz, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 894 days.

(21) Appl. No.: 12/498,568

(22) Filed: Jul. 7, 2009

(65) Prior Publication Data

US 2010/0011578 A1 Jan. 21, 2010

(30) Foreign Application Priority Data

Jul. 15, 2008 (DE) .......................... 10 2008 033 269

(51) Int. Cl.
*B21D 53/10* (2006.01)
(52) U.S. Cl. ........... 29/890.122; 29/890.12; 29/890.126; 29/890.132; 137/533.11
(58) Field of Classification Search ............... 29/890.12, 29/890.121, 890.122, 890.124, 890.126, 29/890.132; 251/357–365; 137/533.11, 137/539, 539.5, 540, 543.19
See application file for complete search history.

(56) References Cited

U.S. PATENT DOCUMENTS

| 2,069,153 | A | * | 1/1937 | Konkle | 29/890.13 |
|---|---|---|---|---|---|
| 4,084,304 | A | * | 4/1978 | Myers | 29/890.122 |
| 4,086,936 | A | * | 5/1978 | Vork | 137/533.11 |
| 4,292,831 | A | * | 10/1981 | Simon | 72/260 |
| 4,611,374 | A | * | 9/1986 | Schnelle et al. | 29/890.13 |
| 4,862,571 | A | * | 9/1989 | Prinz et al. | 29/890.12 |
| 5,107,890 | A | * | 4/1992 | Gute | 137/539 |
| 6,105,610 | A | * | 8/2000 | Watkins et al. | 137/516.29 |
| 6,244,295 | B1 | * | 6/2001 | Bartussek et al. | 137/540 |
| 6,651,693 | B2 | * | 11/2003 | Simmons et al. | 137/329.05 |
| 6,981,512 | B2 | * | 1/2006 | Meyer | 137/15.22 |
| 7,311,118 | B2 | * | 12/2007 | Doutt | 137/539.5 |
| 8,096,319 | B2 | * | 1/2012 | Beck | 137/543.19 |
| 2008/0029165 | A1 | | 2/2008 | Beck | |

* cited by examiner

*Primary Examiner* — David Bryant
*Assistant Examiner* — Ryan J Walters
(74) *Attorney, Agent, or Firm* — Cozen O'Connor

(57) ABSTRACT

A check valve includes a housing, a bore, and a liftably movable valve body which is spring-loaded at least after a small axial travel of the valve body and tightly contacts a valve seat. The bore is constructed as a stepped bore, the bore section of smaller diameter having the valve seat, and the bore section of larger diameter receiving the liftably movable valve member. A ball which is held captive by a holding element arranged in the bore is provided as valve body. The valve seat has a contour corresponding to the valve body in the area of the contact surface of the valve body.

8 Claims, 4 Drawing Sheets

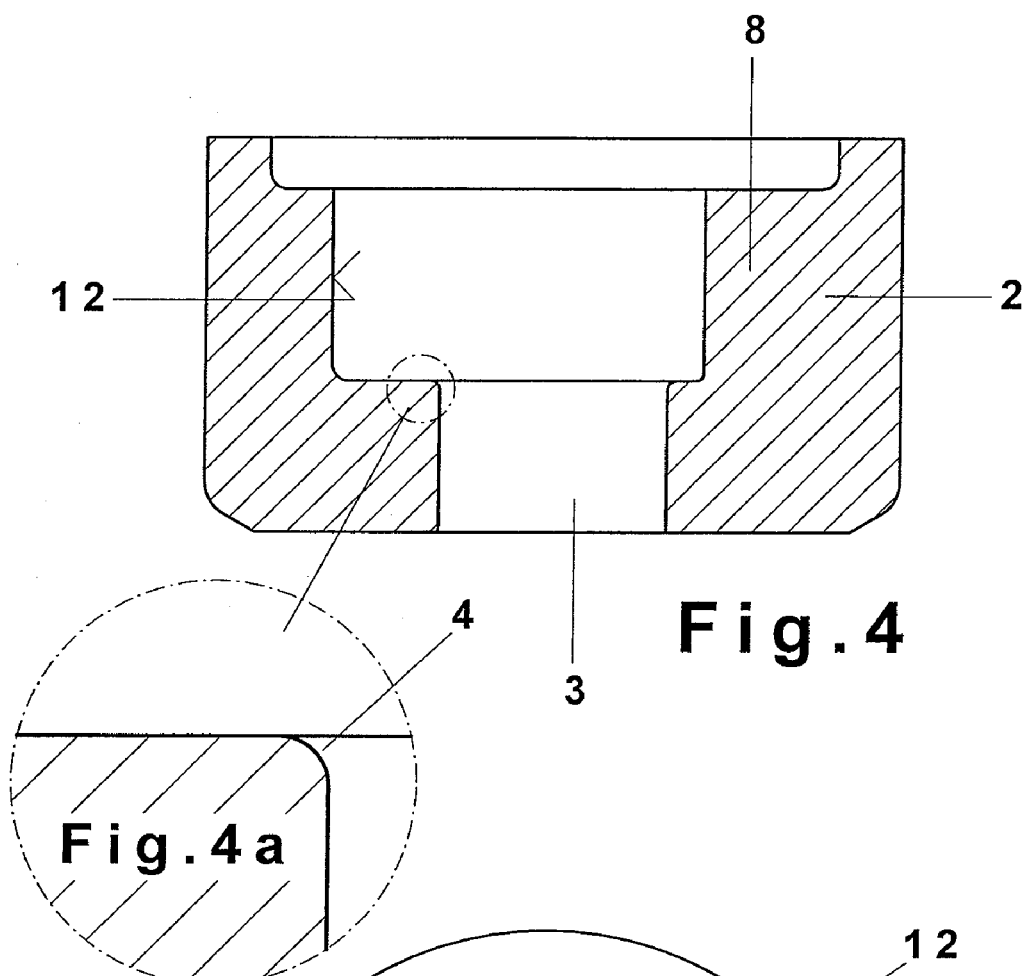
Fig.4
Fig.4a
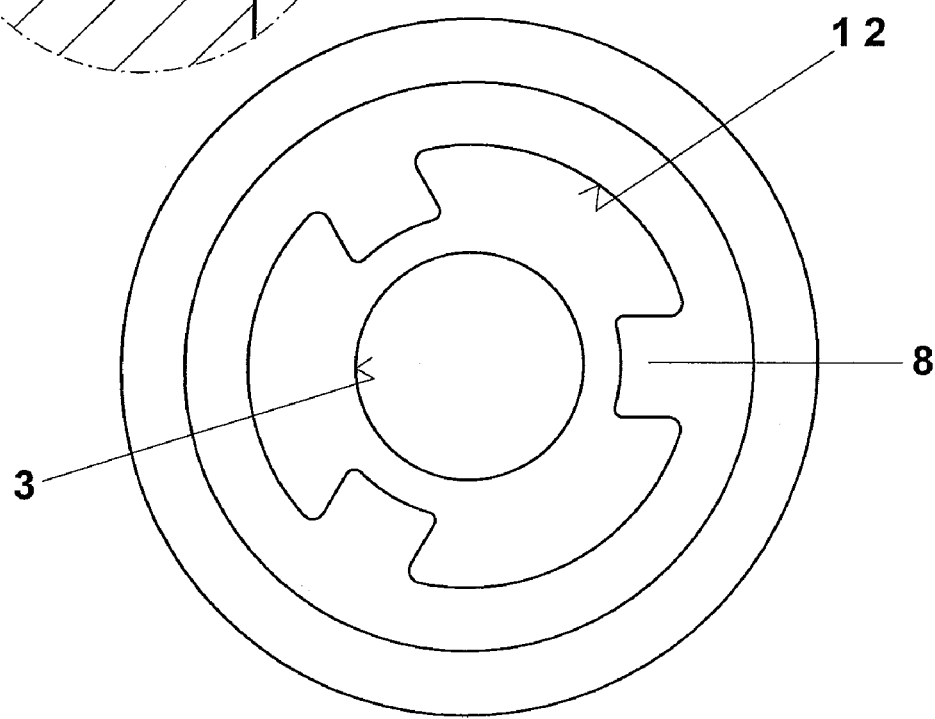
Fig.5

METHOD OF MANUFACTURING A CHECK VALVE

BACKGROUND OF THE INVENTION

1. Field of the Invention

The invention is directed to a check valve comprising a housing, a bore, and a liftably movable valve body which is spring-loaded at least after a small axial travel of the valve body and tightly contacts a valve seat, wherein the bore is constructed as a stepped bore, the bore section of smaller diameter having the valve seat, and the bore section of larger diameter receiving the liftably movable valve member, and a ball which is held captive by a holding element arranged in the bore is provided as valve body.

2. Description of the Related Art

Check valves in which a liftably movable valve body is arranged in a spring-loaded manner in a bore arranged in a housing are already known (US2008/0029165). The valve body is arranged in a stepped bore, and the transition of the bore section having the larger diameter to the inflow bore section having the smaller diameter forms the valve seat which is contacted by a ball serving as valve body. The housings in check valves of this kind are usually made of sintered metal. The valve seat is machined in a suitable manner to achieve a flawless seating of the valve body on the valve seat.

SUMMARY OF THE INVENTION

It is an object of the invention to construct a check valve including a housing, a bore hole, and a liftably movable valve body in such a way that the valve seat can formed in a simple manner.

According to the invention, the valve seat has a contour corresponding to the valve body in the area of the contact surface of the valve body.

It is advantageous that the valve seat has a contact surface corresponding to the outer surface of the valve body in order to achieve a flawless seating of the valve body on the valve seat.

According to another essential feature, the contour is produced by an embossing tool or by the valve body itself.

In a development of the invention, the housing is made of sintered metal.

In an embodiment that is advantageous with respect to manufacturing, the area of the contact surface of the housing has an annular offset. The offset is preferably produced by means of a sizing die and, in doing so, the material is compacted and smoothed in the area of the offset. The offset is produced by a sizing die so that the material in the area of the offset is compacted by means of a sizing ram and is cold worked in so doing. In this way, the surface quality, particularly the roughness, is improved and the surface is strengthened in this area at the same time.

Subsequently, the area of the valve seat can be provided with a contour corresponding to the valve body by means of an embossing tool or by the valve body itself.

Further, the dimension X of the sizing die corresponds to the dimension Y of the housing, or the sizing die has a radius corresponding to the radius of the housing.

According to another development, the valve seat is provided with at least one constant passage. This constant passage can either be produced together with the sizing process or together with the embossing process for producing the contour of the valve seat. This can be carried out economically in one work step.

In another embodiment form, the bore section with the larger diameter is provided with at least three guide webs extending radially inwardly. The guide webs provided in the sintered housing can also advantageously be produced in a first step with the sizing die and/or in the second step with the embossing tool.

In another embodiment form, the blank of the housing is provided with a radius of less than 0.5 mm in the transition from the inflow bore section having a smaller diameter to the bore section having a larger diameter.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 4 is a section view of the housing as a sintered blank;

FIG. 4a is a detail of FIG. 4;

FIG. 5 is a plan view of the housing as a sintered blank;

DETAILED DESCRIPTION OF THE PRESENTLY PREFERRED EMBODIMENTS

Figure 1:
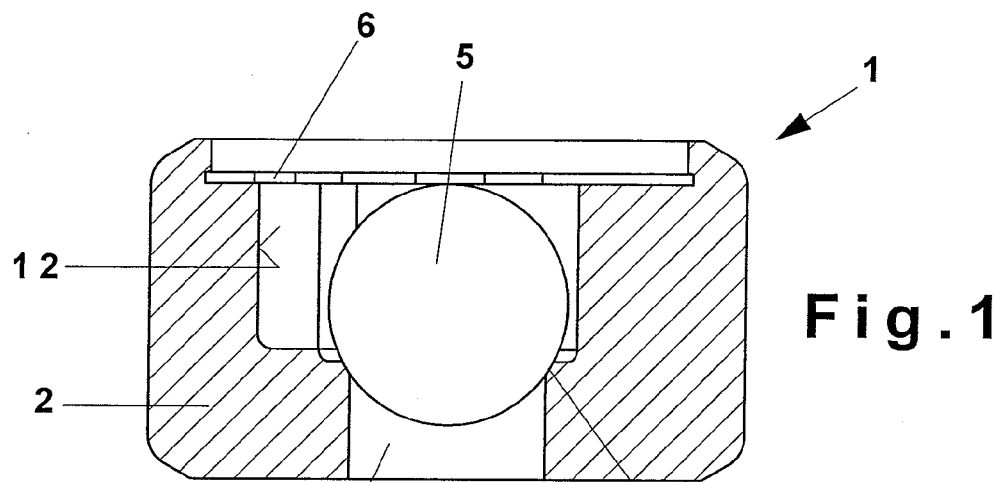
FIG. 1 is a section view of a fully outfitted check valve in the closed position.
Figure 2:
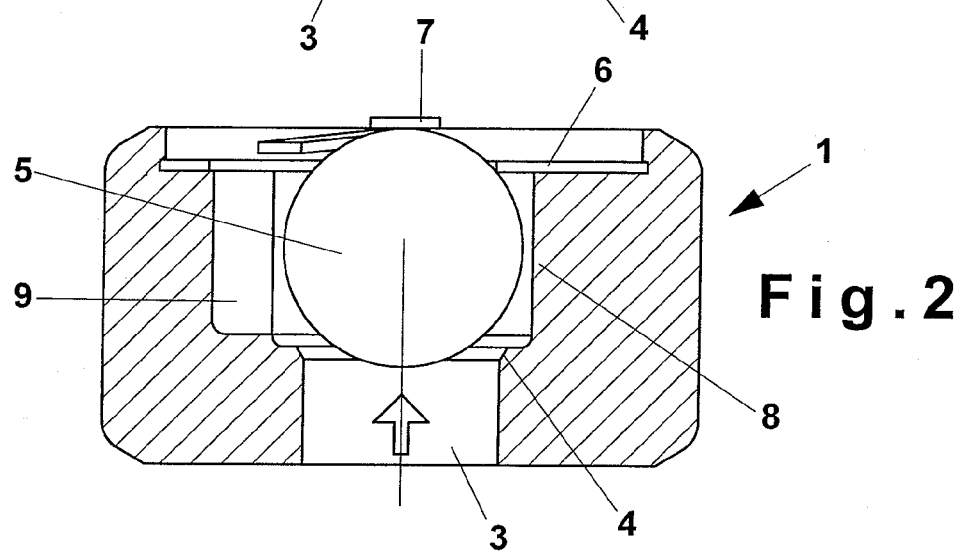
FIG. 2 is a section view of the check valve in the open position.
Figure 3:
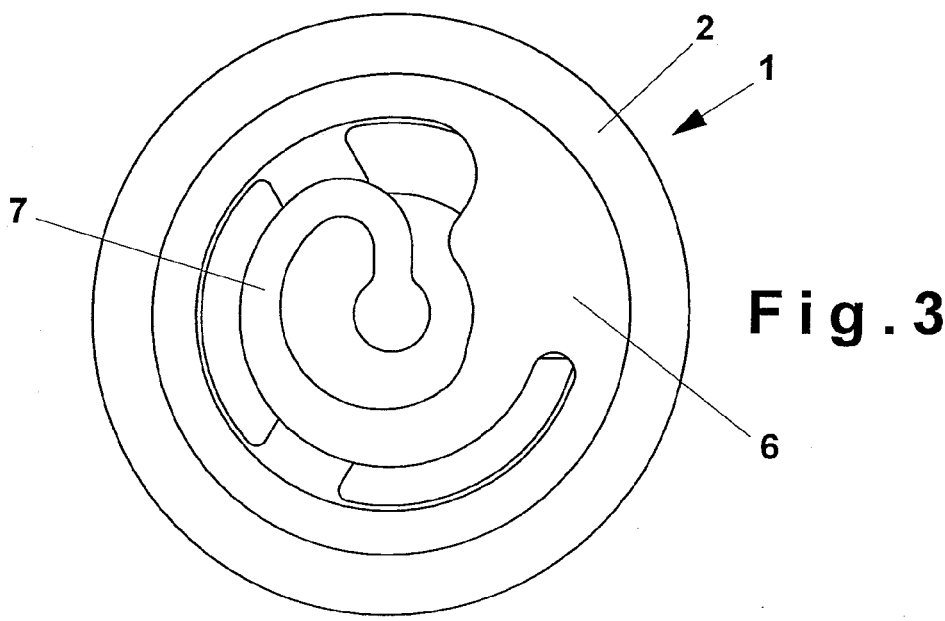
FIG. 3 is a plan view of the check valve.

FIGS. 1 to 3 show a check valve 1 with a housing 2 which can be produced in one work step preferably without undercuts, i.e., as-molded, without any subsequent finishing cutting. This housing is preferably produced by sintering and/or pressing.

The housing 2 has a central inflow bore section 3 which forms the valve seat 4 at the transition to the large bore section 12. The inflow bore section 3 is closed in the area of its valve seat 4 by the valve body 5 which is formed as a ball. A holding element 6 in the form of an inwardly contoured spring disk is arranged above the valve body 5 in such a way that it is securely connected to the housing 2 at its outer edge and spring-loads the valve body 5 toward the valve seat 4.

FIG. 4 shows a housing 2 in section as an individual part. The guide webs 8 are arranged in the larger bore section 12, and the transition from the larger bore section 12 to the inflow bore section 3 is formed as a valve seat 4.

FIG. 4a shows the valve seat 4. Because it is produced by sintering, the valve seat 4 can only be produced with a radius of at least 0.1 mm.

Figure 6:
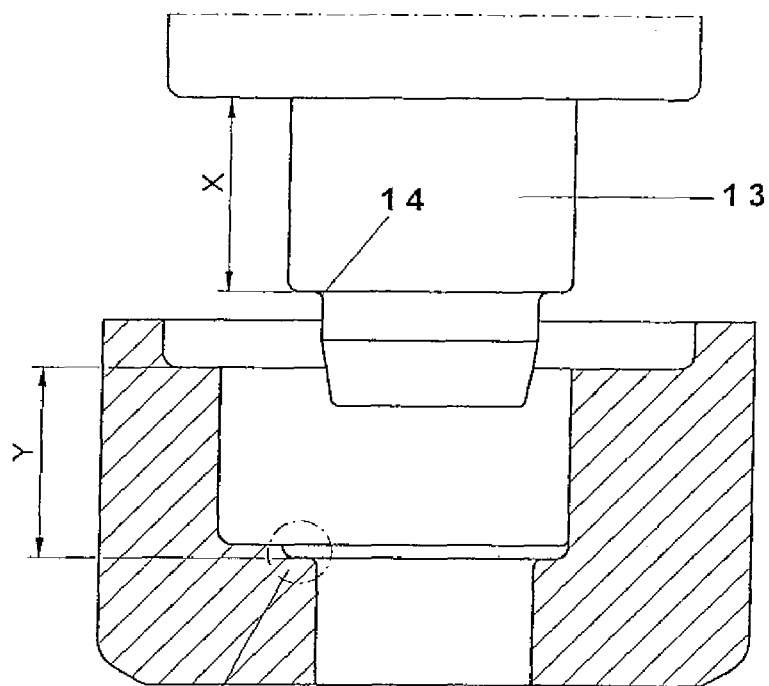
FIG. 6 is a section view of the housing together with a sizing die for producing the offset.
Figure 6A:
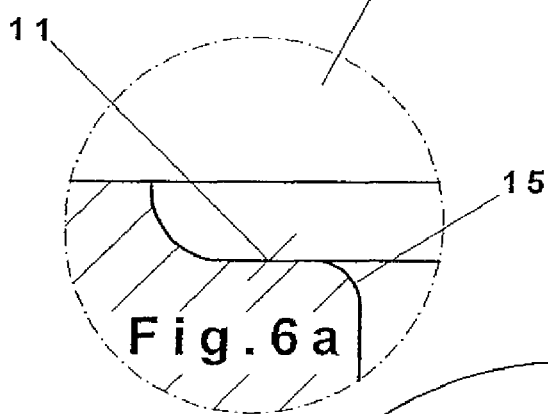
FIG. 6a is a detail of FIG. 6.
Figure 7:
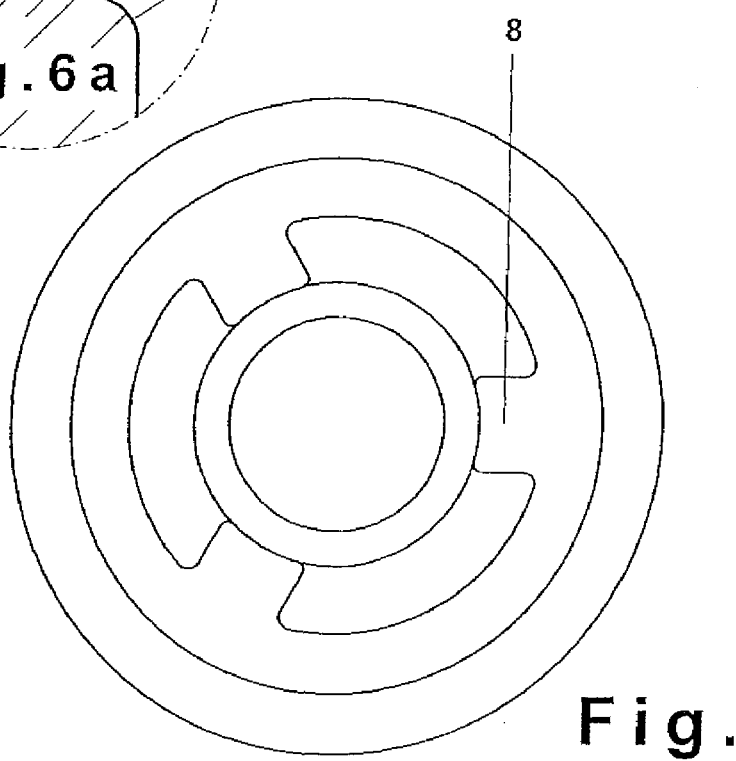
FIG. 7 is a plan view of the housing.

Starting with this blank of the housing 2, an offset 11 is produced according to FIG. 6 by a sizing die 13. In so doing, the material in the offset 11 is compacted and cold worked so that the surface quality, particularly the surface roughness, is improved. The radius 14 generates the offset 11 together with the radius 15 at the housing 2 because the dimension X of the sizing die 13 corresponds to the dimension Y of the housing 2. The diameter of the guide webs 8 can also be produced to the proper dimensions in one work pass by means of the sizing die 13.

Figure 8:
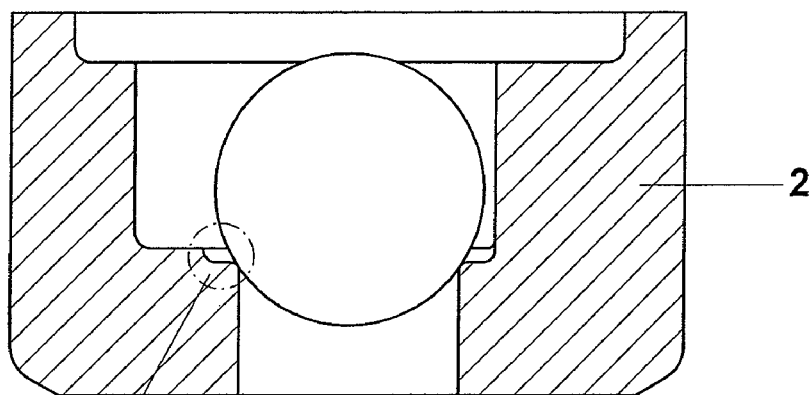
FIG. 8 is a section view of the housing prior to contouring the valve seat.
Figure 8A:
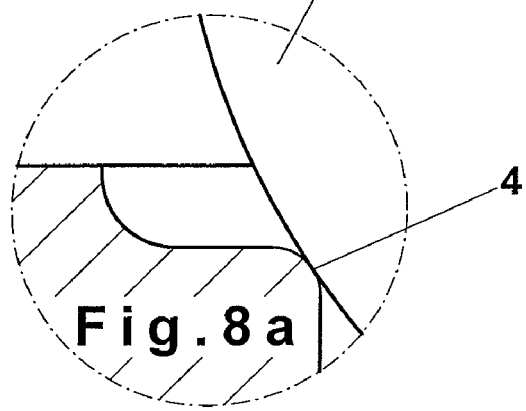
FIG. 8a is a detail of FIG. 8.
Figure 9:
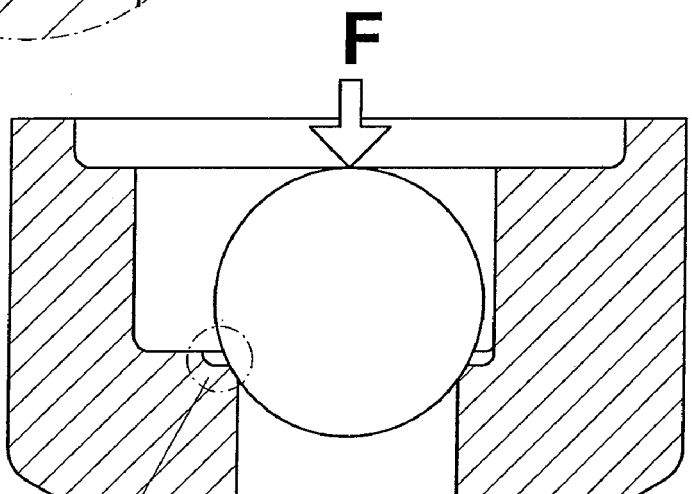
FIG. 9 is a section view showing the contour of the valve seat being formed by embossing with the valve body.
Figure 9A:
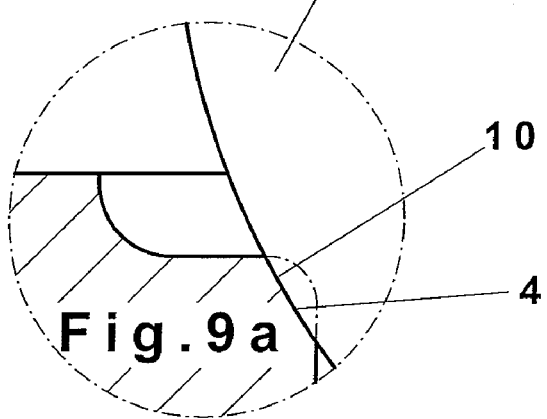
FIG. 9a is a detail of FIG. 9.

FIGS. 8 to 9*a* show that after sizing and production of the offset 11, the contour at the valve seat 4 is worked in a corresponding manner by means of an embossing tool or, as is shown in FIGS. 8 and 9, by means of the valve body formed as a ball. As end result, as shown in FIG. 9*a*, the valve seat 4 has a contact surface corresponding to the contour 10 of the valve body.

Accordingly, by sizing and embossing according to the individual steps shown in FIGS. 6 to 9, the sintered material of the housing 2 is compacted in the area of the valve seat and is formed with the required impermeability by generating the desired contour.

The invention is not limited by the embodiments described above which are presented as examples only but can be modified in various ways within the scope of protection defined by the appended patent claims.

We claim:

1. A method for manufacturing a check valve comprising a housing with a stepped bore, a valve body formed as a ball which is movable in the bore, and a holding element for retaining the valve body in the bore, the method comprising:

forming a housing having a stepped bore comprising a large diameter section, a small diameter section, and a transition therebetween by sintering a powdered metal material;

forming a valve seat by embossing the transition to have a contour corresponding to the ball; and forming an annular offset into the transition, the valve seat being formed at an edge of the annular offset wherein the annular offset is formed by a sizing die prior to forming the valve seat, thereby compacting and smoothing the material in the offset.

2. The method of claim 1 wherein the valve seat is formed using the valve body as an embossing tool.

3. The method of claim 1 wherein the sizing die has a dimension X corresponding to a dimension Y of the housing.

4. The method of claim 1 wherein the sizing die has an inside radius corresponding to an outside radius of the housing where the valve seat is to be formed.

5. The method of claim 1 wherein the large diameter section is formed with at least three guide webs extending radially inward.

6. The method of claim 1 wherein the transition is provided with an outside radius of less than 0.5 mm in the transition between the large diameter section and the small diameter section.

7. The method of claim 1 further comprising:

inserting the valve body into the stepped bore after forming the valve seat; and assembling the holding element to the housing.

8. The method of claim 7 wherein the holding element is formed as a spring which loads the valve body against the valve seat.

\* \* \* \* \*